United States Patent [19]
DeSimone et al.

[11] 3,886,216
[45] May 27, 1975

[54] PROCESS FOR THE PREPARATION OF ALFA BETA-ETHYLENIC KETONES

[75] Inventors: Robert S. DeSimone, Willingboro; Peter S. Gradeff, Andover, both of N.J.

[73] Assignee: Rhodia, Inc., New York, N.Y.

[22] Filed: Feb. 1, 1973

[21] Appl. No.: 328,560

[52] U.S. Cl. .......................... 260/593 R; 260/586 R
[51] Int. Cl. ............................................. C07c 49/20
[58] Field of Search ............ 260/587, 593 R, 586 R

[56] References Cited
UNITED STATES PATENTS
3,029,287  4/1962  Marbet et al. ...................... 260/587
3,456,015  7/1969  Marbet et al. .................. 260/593 R
3,574,715  4/1971  Marbet et al. .................. 260/593 R FOREIGN PATENTS OR APPLICATIONS
666,787  7/1963  Canada ........................... 260/593 R Primary Examiner—Bernard Helfin
Assistant Examiner—James H. Reamer

[57] ABSTRACT

A process is provided for the preparation of $\alpha,\beta$-ethylenic ketones by the condensation of aliphatic and cycloaliphatic tertiary acetylenic carbinols and especially for the preparation of $\Delta^3$-cis-pseudo ionones by the condensation of dehydrolinalool and derivatives thereof with alkenyl ethers at from about 10° to about 150°C. in the presence of cupric nitrate. The $\Delta^3$-cis-pseudo ionones can be cyclized to produce the corresponding $\alpha$-, $\beta$-, and $\gamma$-cis-ionones or alkyl ionones. Methods are also described for rearranging the $\Delta^3$-cis-pseudo ionones to the normally encountered trans-pseudo ionones which in turn can be converted to the trans-ionones.

15 Claims, No Drawings

PROCESS FOR THE PREPARATION OF ALFA BETA-ETHYLENIC KETONES

Iones occupy a prominent place in perfumery. It would be hard today to find a perfume composition that does not contain an ionone. More than one hundred ionones are known; the most widely used ones are β-ionone, α-ionone, the methyl ionones, and the irones. β-ionone also is a principal intermediate in the preparation of synthetic Vitamin A.

The importance of the ionones is reflected in the efforts reported in the literature to find suitable ways for their manufacture. All of the commercial methods start from citral or dehydrolinalool, and proceed via the pseudo ionones to the ionones. For example, citral is condensed with acetone or methyl ethyl ketone, and the pseudo ionone cyclized to ionone. Dehydrolinalool is reacted with ethyl acetoacetate by Carroll's synthesis to pseudo ionone, followed by cyclization. Condensation of citral with 2-ethoxy-propene yields the triethoxy derivative of pseudo ionone which leads to the pseudo ionone (U.S. Pat. No. 3,109,861, dated Nov. 5, 1963, to Guex, Marbet and Montavon). Pseudo ionone also is prepared from dehydrolinalool and methyl acetoacetate or diketene. The rearrangement of dehydroalinalool acetate to enol acetate of citral followed by reaction with acetone and the rearrangement of the allenic ketone formed by condensation of a ketal or an enol ether and dehydrolinallol (U.S. Pat. No. 3,029,287, dated Apr. 10, 1962, to Marbet and Saucy) both yield pseudo ionone.

β-Ionone, for instance, is obtained by cyclization of pseudo ionone under the influence of acid:

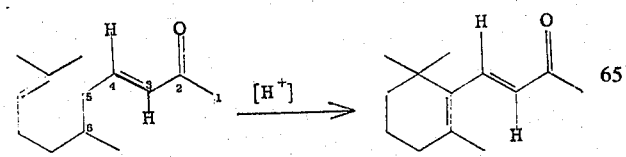

One should notice that in the case of both β-ionone and pseudo ionone, the configuration of the Δ³ double bond conjugated to the carbonyl is possible, This is the normal form. The cis-Δ³ configuration of pseudo ionone has been postulated as theoretically possible, but not favored, and unstable. In fact, efforts to prepare the cis-isomer have all failed (*J. Chem. Soc.* 1965 5528). Two cis-isomers are possible, depending on the configuration of the Δ⁵ double bond:

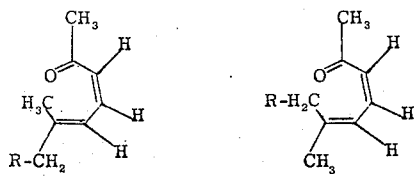

<u>Cis-Δ³, Trans-Δ⁵</u>     <u>Cis-Δ³, Cis-Δ⁵</u>

R=(CH₃)₂-C=CH-CH₂-

Although the cis-pseudo ionone has not been prepared, cis-β-ionone can be prepared by another route, from trimethyl-2,6,6-cyclohexanone, which is reacted with acetylene to form trimethyl-ethynyl-cyclohexanol, followed by a Grignard reaction, as shown below:

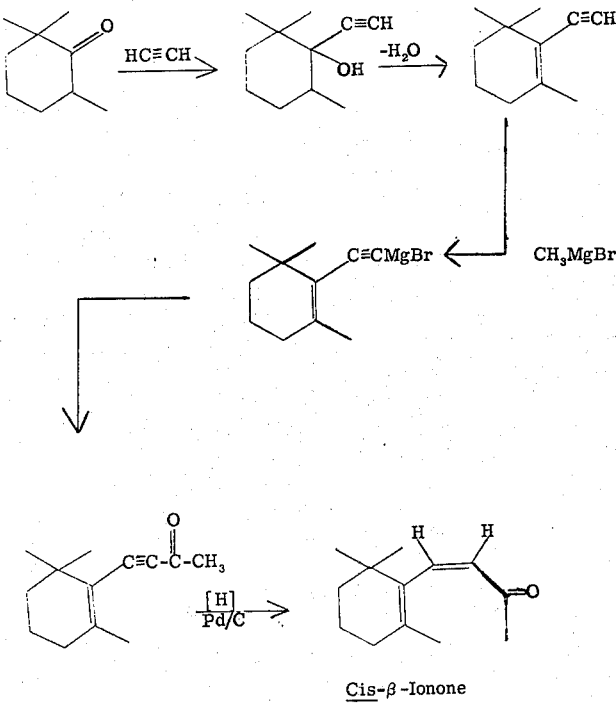

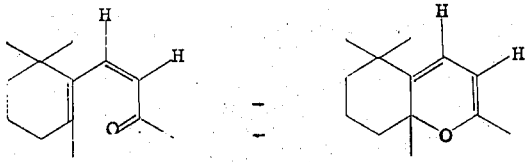

<u>Cis-β-Ionone</u>

The cis-α- or β-ionone can also be obtained by ultra-violet irradiation of α- or β-trans-ionones.

It is believed that the cis-β-ionone is in equilibrium with the pyran structure:

This is discussed in an article published in *J. Am. Chem. Soc.* 88 619-20 (1966). Most recently, Martell et al. (*J. Org. Chem.* 37 2992, (1972)) have also demonstrated that Δ³-cis ionone exists in equilibrium with the pyran form. The preparation of cis-α-ionone from the trans-isomer by irradiation is described by Buchi and Wang in *Helv. Chem. Acta* 160 1339 (1955). However, since the cis-β-ionone apparently also is present in the open chain structure at least to some extent, and the equilibrium is such that the mixture behaves as though it were all in the open chain structure, it is unnecessary to consider the pyran structure in the specification and claims of this application, and it will not be referred to further.

It has now been discovered that the cis-Δ³ -pseudo ionones, compounds previously unknown and considered to be too unstable to exist, can be prepared from dehydrolinalool and its homologues by reaction with alkoxy propenes or butenes in the presence of cupric nitrate as a catalyst. At a relatively small, catalyst concentration, the cis-isomer is obtained in predominant amount. The trans-isomer is obtained in predominanat amount at a relatively high catalyst concentration. Furthermore, it appears that of the two possible cis-Δ³ isomers, cis-Δ³-cis-Δ⁵, and cis-Δ³-trans-Δ⁵, only one is present, and interpretation of some analytical data points to the cis-Δ³-trans-Δ⁵ isomer.

It is quite surprising that the cis-Δ³ isomer is obtained in this process, since all other known processes (such as that of U.S. Pat. No. 3,029,287) starting from dehydrolinalool and its homologues lead to the trans-Δ³-pseudo ionones. It appears that the cupric nitrate catalyst is primarily responsible for this remarkable result, and the cupric nitrate also makes possible the obtention of the cis-Δ³-isomer in a one step process.

The cis-Δ³-pseudo ionones can be converted to the cis-ionone which exists in equilibrium with the α-pyran form, and this can be isomerized to the trans-ionone. The cis-Δ³-pseudo ionone can also be isomerized to the trans-Δ³-pseudo ionone, and this can be converted to the trans-ionone.

Accordingly, in the process of the instant invention, one of the class of dehydrolinalool and its derivatives thereof is reacted with an isoalkenyl ether at a temperature within the range from about 10° to about 150°C. in the presence of cupric nitrate to produce the corresponding Δ³-cis- and/or trans-pseudo-ionone or Δ³-cis- and/or trans-pseudo methyl ionone. The alkenyl group of the ether has from three to four carbon atoms, and the class includes isopropenyl and isobutenyl lower alkyl ethers. The substituent groups of the dehydroalinalool include alkyl, alkenyl, cycloalkyl and cycloalkenyl, the alkyl and alkenyl groups having from one to about thirty carbon atoms, and the cycloalkyl and cycloalkenyl having from three to about thirty carbon atoms. The lower alkyl and alkenyl homologues, the alkyl having from one to four carbon atoms, and the alkenyl from two to four carbon atoms, are preferred. At large catalyst concentrations, while some trans-Δ³-isomer may be obtained, the cis-Δ³-isomer is produced in predominant proportion. At small catalyst concentrations, while some cis-Δ³-isomer may be obtained, the trans-Δ³-isomer is produced in predominant proportion.

The cis-Δ³-pseudo ionones offer a convenient and direct route for preparation of the corresponding cis-ionones and cis-methyl ionones.

The cis-Δ³-pseudo ionones can be isomerized to the trans-Δ³-isomers, which lead to the corresponding known ionones and methyl ionones.

The process of the invention is applicable to any tertiary acetylenic carbinol having the general formula:

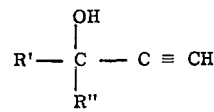

wherein:
a. R' is selected from the group consisting of:

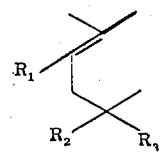

wherein R₁, R₂ and R₃ are selected from the group consisting of hydrogen, lower alkyl and lower alkenyl, having from one to about four carbon atoms;

(ii)

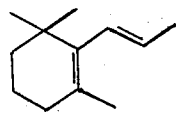

(iii)

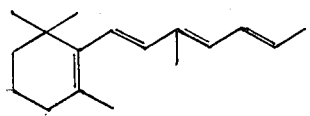

(iv)

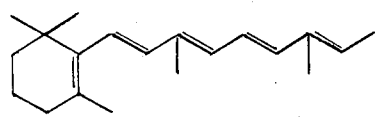

b. R″ is selected from the group consisting of lower alkyl and lower alkenyl, having from one to about four carbon atoms.

In the case where the isoalkenyl ether is an isopropenyl ether, the condensation reaction of the invention proceeds as represented by Scheme I to produce an α, β-ethylenic ketone:

SCHEME I

R = lower alkyl having from one to about four carbon atoms

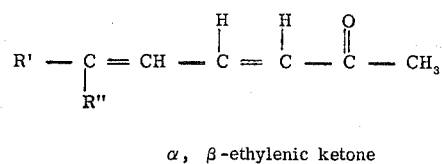

Isopropenyl ether

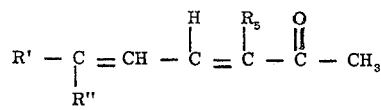

α, β-ethylenic ketone

When the isoalkenyl ether is an isobutenyl or higher alkenyl ether, the condensation reaction proceeds as shown in Scheme II, to produce two or more isomeric α, β-ethylenic ketones:

SCHEME II

R and $R_5$ = lower alkyl having from one to four carbon atoms

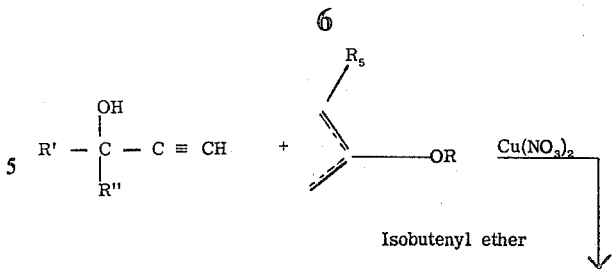

Isobutenyl ether

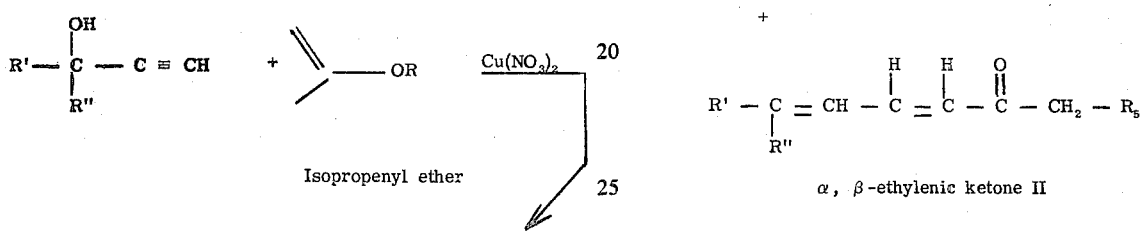

α, β-ethylenic ketone I

+

α, β-ethylenic ketone II

The class of tertiary acetylenic alcohols having a dehydrolinalool structure is an example. The dehydrolinalools to which the process of the invention is applicable have the general formula:

wherein $R_1$, $R_2$ and $R_3$ are selected from the group consisting of hydrogen, lower alkyl and lower alkenyl, as indicated above, having up to about four carbon atoms, and $R_4$ is selected from the group consisting of lower alkyl and lower alkenyl having up to about four carbon atoms.

In the case where the isoalkenyl ether is an isopropenyl ether, the application to the class of dehydrolinalool of the reactions of the invention result in a cis- and/or trans-$\Delta^3$-pseudo ionone, and can be represented by Scheme III:

SCHEME III

R = lower alkyl having from one to four carbon atoms

Reaction (a) - Condensation

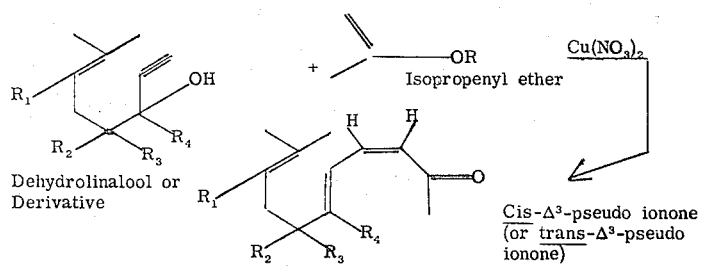

Dehydrolinalool or Derivative

Isopropenyl ether

Cis-$\Delta^3$-pseudo ionone (or trans-$\Delta^3$-pseudo ionone)

Reaction (b) - Isomerization

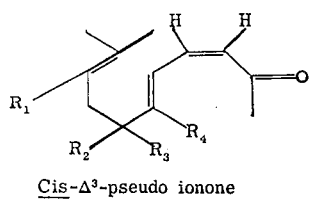

Cis-Δ³-pseudo ionone

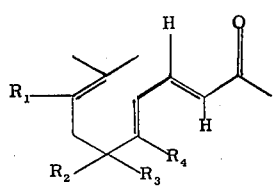

Trans-Δ³-pseudo ionone

Reaction (c) - Cyclization

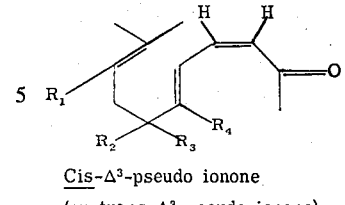

Cis-Δ³-pseudo ionone
(or trans-Δ³-pseudo ionone)

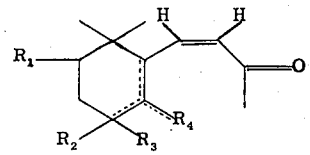

Cis- (α-, β-, γ-) ionone
(or trans (α-, β-, γ-) ionone)

When the isoalkenyl ether is an isobutenyl or higher alkenyl ether, the application to the class of dehydrolinalools of the reactions of the invention result in two or more isomeric cis- and/or trans-Δ³-pseudo ionones, and can be represented by Scheme IV:

SCHEME IV

R and R₅ = lower alkyl having from one to four carbon atoms

Reaction (a) - Condensation

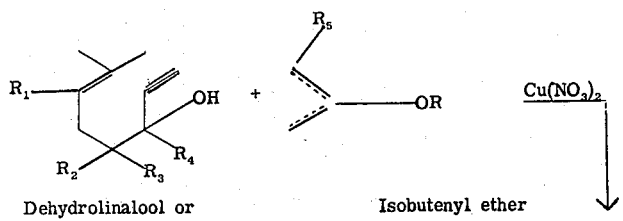

Dehydrolinalool or Homologue    Isobutenyl ether

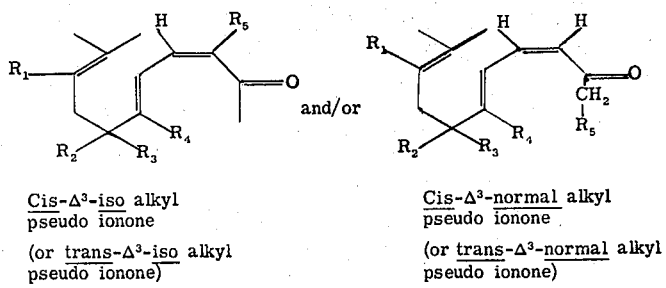

Cis-Δ³-iso alkyl pseudo ionone
(or trans-Δ³-iso alkyl pseudo ionone)

Cis-Δ³-normal alkyl pseudo ionone
(or trans-Δ³-normal alkyl pseudo ionone)

Reaction (b) - Isomerization to trans-Δ³-isomer

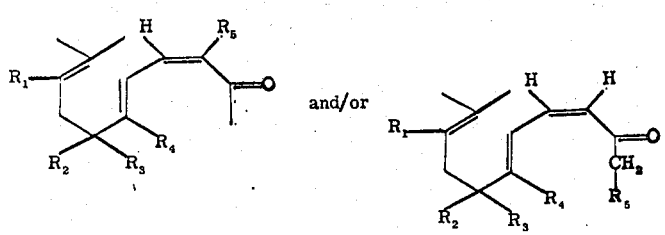

Cis-Δ³-iso alkyl pseudo ionone

Cis-Δ³-normal alkyl pseudo ionone

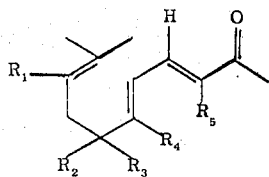
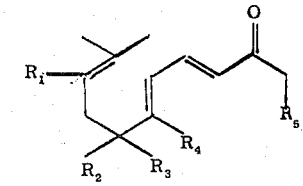

and/or

Iso alkyl pseudo ionone

Normal alkyl pseudo ionone

Reaction (c) - Cyclization

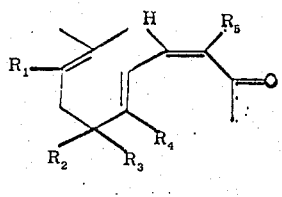

and/or

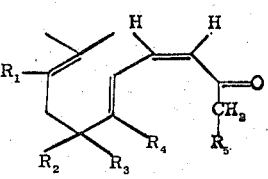

Cis-Δ³-iso alkyl pseudo ionone

Cis-Δ³-normal alkyl pseudo ionone

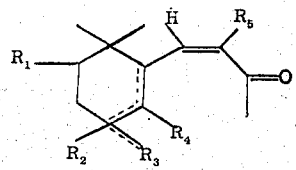

and/or

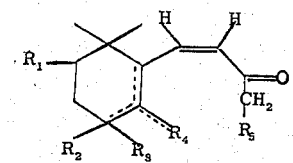

Cis-iso alkyl ionone

Cis-normal alkyl ionone

While the process in accordance with the invention is operative with lower isoalkenyl ethers in which $R_5$ is higher than methyl, such as ethyl, propyl, and isobutyl, the process is of major commercial interest when $R_5$ is methyl.

The terms "cis-Δ³-pseudo ionone," "cis-Δ³-iso alkyl pseudo ionone" and "cis-Δ³-normal alkyl pseudo ionone" are used generically herein to refer to compounds of the formulae represented above. Likewise, the terms "cis-ionone" and "cis-alkyl ionone" are used generically to refer to cis-ionones of the formulae represented above. However, it will be apparent that isopropenyl ethers produce pseudo ionones, and that isobutenyl ethers produce cis-Δ³-alkyl pseudo ionones. The cis-alkyl-pseudo ionones exist in iso and normal forms. Upon cyclization, both pseudo ionones and alkyl pseudo ionones produce mixtures of cis-α-, β-, and γ-ionones and cis-alkyl ionones.

It will of course be understood that when $R_2$ and $R_3$ are both lower alkyl, the α-ionone isomers do not exist.

During the coupling of the isoalkenyl ether with the tertiary acetylenic carbinol, the R substituent of the isoalkenyl ether is converted to the corresponding alcohol which is normally trapped by the excess of isoalkenyl ether.

When $R_1$, $R_2$, and $R_3$ are hydrogen and $R_4$ is methyl, the acetylenic alcohol is dehydrolinalool. Condensation of dehydrolinalool with an isopropenyl ether produces cis-Δ³-pseudo ionone, and the condensation of dehydrolinalool with isobutenyl ethers produces cis-Δ³-methyl pseudo ionone in both iso and normal forms.

Derivatives and homologues of dehydrolinalool in like manner give the corresponding pseudo ionones and 3³-methyl pseudo ionones in iso and normal forms.

The process of the invention is applicable, for instance, to the following tertiary acetylenic carbinols:

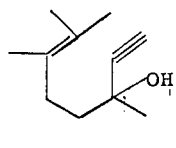 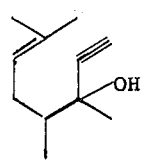 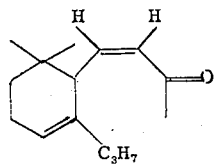 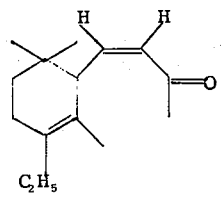

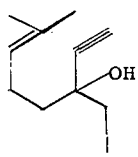 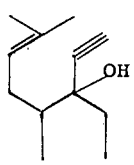 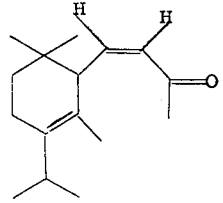 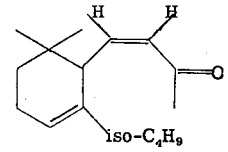

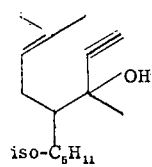 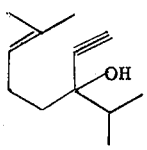 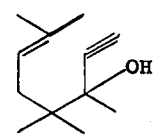

In the case when $R_2$ and $R_3$ are both alkyl, for instance,

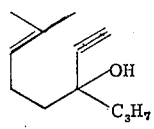 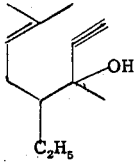 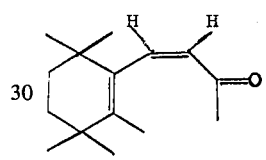

the corresponding cis-ionones are only $\beta$- and $\gamma$-:

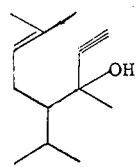 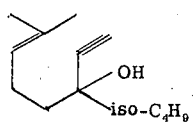

and

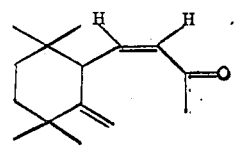

These lead to preparation of the following exemplary cis-α-ionones, when as isopropenyl ether is used as a reagent, in Scheme I:

These lead to preparation of the following exemplary cis-iso-methyl-α-ionones, when the corresponding isobutenyl ether is used as a reagent, in Scheme II:

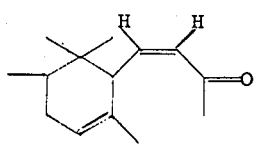 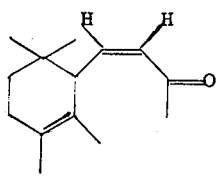 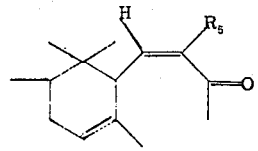 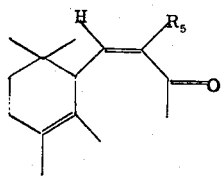

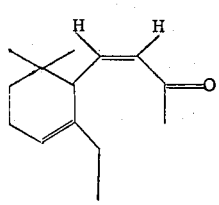 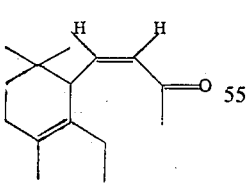 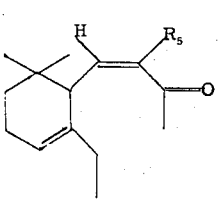 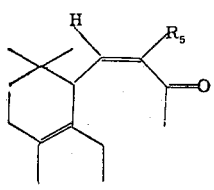

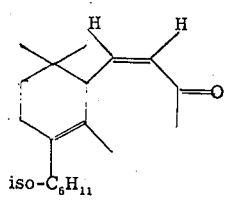 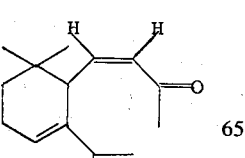 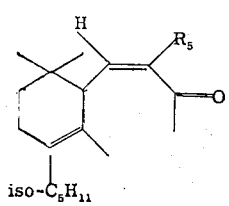

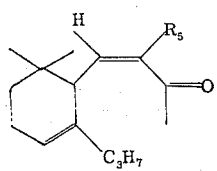 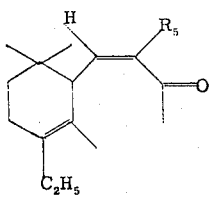

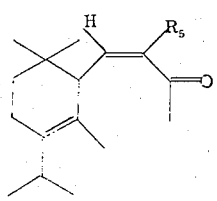 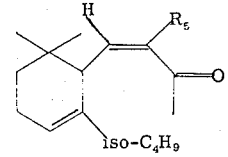

The process of the invention is also applicable, for instance, to the following cases:

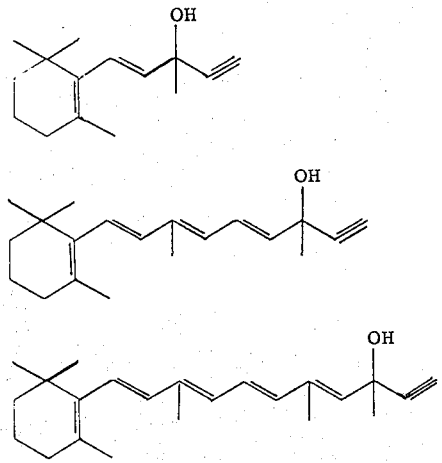

The reaction in accordance with the invention proceeds only in the presence of cupric nitrate. Cuprous copper salts are not effective, and neither is copper metal. Nitrates of other metals have been tried, but none has been found to be effective.

The amount of catalyst can be rather small. An amount as low as 0.1% is effective, but better results are obtained with amounts within the range from about 1% to about 5%. While larger amounts than 5% can be used, up to approximately 10%, there seems to be no advantage commensurate with the larger amount of catalyst employed. It has been observed that smaller amounts of catalyst, from about 0.1 to about 3.5%, favor the formation of the cis-isomer, and larger amounts, from about 3.5 to about 10%, favor the formation of the trans-isomer. Possibly at the larger amounts cis-isomer is isomerized to trans-isomer.

The reaction mixture may not need to be heated. An exothermic reaction starts spontaneously at room temperature and the heat generated is sufficient to drive the condensation reaction of the tertiary acetylenic carbinol and the isoalkenyl ether to a satisfactory degree of completion in short time without need of applying external heat. Additional heating however may help reach a higher degree of completion. Cupric nitrate becomes soluble in the reaction mixture and the system is therefore homogeneous.

Because of the low boiling point of the isoalkenyl ether, when operating at temperatures above 45°C., the reaction is carried out in a closed vessel, so as to retain the isoalkenyl ether within the reaction mixture.

When the reaction is carried out at low temperature, for instance, room temperature, no pressure equipment is necessary and this is an advantage. For instance, the isoalkenyl ether can be fed into the reaction mixture of acetylenic carbinol and catalyst, preferably while maintaining the temperature between 10° and 45°C., and preferably between 15° and 38°C., until all of the isoalkenyl ether is added and until the exothermic reaction has proceeded to a satisfactory degree of completion without the need of applying heat.

The reaction time is normally within the range from about 0.2 hour to about 3 days, depending upon the reagents, the degree of agitation, temperature and the amount of catalyst present. Usually, the reaction can be discontinued after about 2 to about 40 hours.

The reaction proceeds at temperatures from about 10°C. to about 150°C., preferably from 15° to 125°C. At temperatures below 10°C., the reaction proceeds at a slow rate.

The cis-$\Delta^3$-pseudo ionone after isolation from the reaction mixture can be cyclized to the ionone or alkyl ionone using an acidic cyclizing reagent. This reaction is conventional, and proceeds in the usual manner, under normal operating conditions, using conventional acids, for example, phosphoric acid in the presence of a suitable solvent, and heating, or a sulfuric acid-acetic acid mixture at low temperature.

It is also possible to isomerize the cis-$\Delta^3$-pseudo ionone to the corresponding trans-$\Delta^3$-pseudo ionone by irradiation with ultraviolet light or by treatment with an isomerizing reagent, such as iodine. The isomerization can also be accomplished upon heating for extended periods. The isomerization takes place at room temperature, although elevated temperatures up to about 150°C. can be employed. Very small amounts of reagent are effective. As little as 0.2% reagent can be used. Isomerization is complete when amounts within the range from about 0.2 to 0.4% reagent is used. Amounts in excess of this, up to about 10%, can be employed, but no advantage appears to be obtained in doing so.

A preferred isomerizing reagent is an elemental halogen, such as bromine or iodine. Iodine is best used in solution in an inert solvent for iodine, such as isopropyl ether or ethyl ether, to facilitate contact with the cis-pseudo ionone or alkyl pseudo ionone.

In general, any acid or base or acidic or basic salt can be used as the isomerizing reagent, to effect isomerization of cis-$\Delta^3$ to trans-$\Delta^3$-pseudo ionone; acids include sulfonic acids such as paratoluene sulfonic acid, and octane sulfonic acid; carboxylic acids such as formic acid, acetic acid, trichloroacetic acid and propionic acid; inorganic acids such as nitric acid, phosphoric acid, sulfuric acid, and hydrochloric acid; and Lewis acids, such as $BF_3$. Bases include sodium hydroxide, potassium hydroxide, and ammonium hydroxide, and silver nitrate is an example of a salt.

Isomerization also can be effected by irradiation with ultraviolet light. The isomerization proceeds at room temperature under such irradiation and in a relatively short time, from 0.2 hour up to 10 hours.

Heating at an elevated temperature within the range from about 50° to about 150°C. can also isomerize the cis-$\Delta^3$ to trans-$\Delta^3$-pseudo ionone. Heating is sufficient by itself, although addition of an isomerizing reagent or irradiation with ultraviolet light may expedite the isomerization reaction.

It has also been observed that agitation at room temperature for several hours in the presence of copper nitrate converts the cis-$\Delta^3$-pseudo ionone to the trans-isomer.

By direct cyclization of the cis-$\Delta^3$-pseudo ionone with strong acids, a mixture containing large amounts of cis-($\alpha$-, $\beta$-, and $\gamma$-) ionone can be obtained. The cis-($\alpha$-, $\beta$-, and $\gamma$-) ionones have quite distinct olfactory characteristics, different from trans-$\alpha$-, $\beta$-, and $\gamma$-ionones, and are useful as perfume agents.

The following Examples in the opinion of the inventors represent preferred embodiments of the invention:

EXAMPLE 1

Dehydrolinalool (15.2 g) was combined with 21.4 g of 2-methoxy propene and 0.3 g of $Cu(NO_3)_2.3H_2O$ in a pressure-resistant glass vessel containing a magnetic stirring bar. Upon swirling the mixture, the salt dissolved and an exothermic reaction took place, the solution turning brown. Analysis by gas-liuqid chromatography showed approximately 40% cis-$\Delta^3$-pseudo ionone had been formed at this point. The reaction mixture was then heated at 90°C. for 17 hours. After cooling and washing with water, the mixture was concentrated under aspirator vacuum. Flash distillation of the remaining oil of 38° to 160°C. head temperature and 0.8 mm Hg gave 18.2 g of distillate and 1.7 g of residue. Analysis by gas-liquid chromatography of the distillate showed it to contain 6.53 g of dehydrolinalool, 8.01 g of cis-$\Delta^3$-pseudo ionone and 0.71 g of trans-$\Delta^3$-pseudo ionone.

EXAMPLE 2

Dehydrolinalool (15.2 g) was combined with 21.4 g of 2-methoxy propene and 0.3 g of pulverized $Cu(NO_3)_2.3H_2O$ in a pressure-resistant glass vessel, containing magnetic stirring bar, and the mixture swirled with solution of the salt. Upon dissolving of the salt, a color change to brown occurred with an exothermic reaction taking place within a few minutes. The mixture was allowed to stand for one hour whereupon analysis by gas-liquid chromatography showed about 40 to 50% condensation product present (mainly cis-$\Delta^3$-pseudo ionone). The mixture was then immersed in an oil bath at 90°C. for 70 minutes. After cooling, the mixture was washed with water, low boiling components were removed under aspirator vacuum and the resulting oil flash-distilled at 60° to 191°C. vapor temperature, 1.0 mm Hg, to give 16.3 g of distillate and 3.5 g of residue. The distillate upon analysis by gas-liquid chromatography was shown to contain 7.78 g of dehydrolinalool, 5.8 g of cis-$\Delta^3$-pseudo ionone and 1.03 g of trans-$\Delta^3$-pseudo ionone.

EXAMPLE 3

Dehydrolinalool (15.2 g) was combined with 21.4 g of 2-methoxy propene and 0.3 g of pulverized $Cu(NO_3)_2.3H_2O$ in a pressure-resistant glass vessel equipped with magnetic stirring bar. After an initial exothermic reaction, the resulting homogeneous mixture was allowed to stir at ambient temperature for 17 hours. The mixture was washed with water, low boiling components were removed via aspirator vacuum, and the remaining oil flash-distilled at 68° to 214°C. head temperature, 1.0 mm Hg to give 16.2 g of distillate and 2.0 g of residue. Analysis by gas-liquid chromatography of the distillate showed it to contain 8.2 g of dehydrolinalool, 6.05 g of cis-$\Delta^3$-pseudo ionone and 0.79 g of trans-$\Delta^3$-pseudo ionone.

EXAMPLE 4

Into a 100 ml two-necked flask equipped with a magnetic stirrer, thermometer, additional funnel and cooling bath was charged 0.99 of pulverized cupric nitrate trihydrate and 15.2 g of dehydrolinalool. Methoxy propene (21.6 g) was then added dropwise over a 1.5 hour period with cooling at 10° to 20°C. After stirring at ambient temperature overnight, the solution (dark brown at this point) was washed three times with approximately 75 ml of water (each wash being cross-extracted with cyclohexane). The organic phases were combined, dried over sodium sulfate and the solvent removed at about 40 mm Hg. Flash distillation of the remaining oil at 1.5 to 0.3 mm Hg, 70° to 200°C. pot temperature and 40° to 140°C. head temperature, gave 14.8 g of distillate and 5.8 g of residue. The distillate by gas-liquid chromatographic analysis contained 9.04 g dehydrolinalool, a trace of cis-$\Delta^3$-pseudo ionone and 3.85 g of trans-$\Delta^3$-pseudo ionone.

EXAMPLE 5

Into a pressure vessel with magnetic stirrer and containing 15.2 g dehydrolinalool and 21.6 g 2-methoxy propene was added 30 mg copper nitrate trihydrate. This was stirred at ambient temperature for 16 hours, and then at 50°C. for 93 hours.

An additional 30 mg copper nitrate trihydrate was added and stirred at 50°C. for 20.5 hours.

A final portion of 30 mg copper nitrate trihydrate was added and stirred at 50°C. for 7 hours. At this stage, the reaction mixture was dark brown in color with no insoluble solids present.

The reaction mixture was taken up into cyclohexane (50 ml) and washed with 3 × 75 ml water (the water being back-extracted with cyclohexane), the organic phases were combined, dried over sodium sulfate, and the solvent removed at about 40 mm Hg.

Flash distillation of the remaining oil at 1.0–1.3 mm Hg, 80°C. to 156°C. pot temperature, and 60°C. to 109°C. head temperature, gave 13.3 g of distillate and 5.8 g of residue. The distillate by gas-liquid chromatographic analysis contained 4.79 g dehydrolinalool, 4.65 g cis-$\Delta^3$-pseudo ionone and 0.32 g trans-$\Delta^3$-pseudo ionone.

EXAMPLE 6

Isomerization of cis-$\Delta^3$-pseudo ionone to trans-$\Delta^3$-pseudo ionone was carried out using copper nitrate by placing 4.8 g of an oil containing 3 g of cis-$\Delta^3$-pseudo ionone and 1.5 g trans-$\Delta^3$-pseudo ionone into a flask. The flask was kept under a static nitrogen head. To the oil was added 0.3 g of copper nitrate trihydrate and the mixture was stirred for 24 hours at ambient temperature. The mixture was then diluted with cyclohexane, washed with water, dried over sodium sulfate, and the solvent removed at 40 mm Hg.

Flash distillation of the remaining oil at 0.5–0.2 mm Hg at 103° to 160°C. pot temperature and 60° to 104°C. head temperature gave 3.8 g distillate and 1.3 g residue.

The distillate by gas-liquid chromatographic analysis was found to contain trace amounts of cis-$\Delta^3$-pseudo ionone and 3.24 g of trans-$\Delta^3$-pseudo ionone.

Having regard to the foregoing disclosure, the following is claimed as the inventive and patentable embodiments thereof:

1. A process for preparing cis-pseudo ionones and cis-pseudo methyl ionones from dehydrolinalool and lower alkyl or alkenyl derivatives thereof by condensation with an isopropenyl or isobutenyl lower alkyl ether, comprising condensing dehydrolinalool or a lower alkyl or alkenyl derivative thereof having the formula:

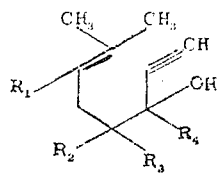

wherein $R_1$, $R_2$, $R_3$ and $R_4$ are selected from the group consisting of hydrogen, lower alkyl and lower alkenyl having from one to about four carbon atoms and an isopropenyl or isobutyl lower alkyl ether in the presence of cupric nitrate at a reaction temperature within the range from about 10° to about 150°C., thereby obtaining a cis-$\Delta^3$-pseudo ionone or a cis-$\Delta^3$-pseudo methyl ionone.

2. A process according to claim 1, in which the reaction time is from 0.2 to about 72 hours.

3. A process according to claim 1, in which dehydrolinalool is condensed.

4. A process according to claim 1, in which dehydrolinalool is condensed with an isobutenyl ether to form iso and normal pseudo methyl ionone.

5. A process according to claim 1, in which the amount of cupric nitrate is within the range from about 0.1% to about 3.5% by weight of the reaction mixture.

6. A process according to claim 1, in which the amount of cupric nitrate is within the range from about 3.5% to about 10% by weight of the reaction mixture.

7. A process according to claim 1, in which the reaction temperature is from 15° to 125°C.

8. A process for preparing $\alpha$, $\beta$-ethylenic ketones, which comprises condensing a tertiary acetylenic carbinol having the formula:

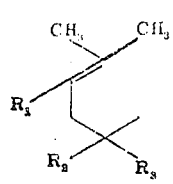

wherein:
a. R' is selected from the group consisting of:

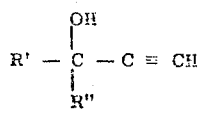

wherein $R_1$, $R_2$ and $R_3$ are selected from the group consisting of hydrogen, lower alkyl and lower alkenyl having from one to about four carbon atoms;

(ii)

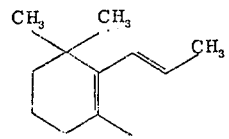

(iii)

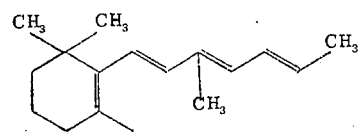

(iv)

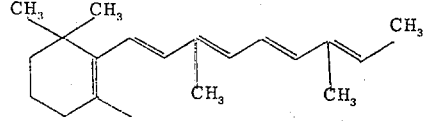

b. R'' is selected from the group consisting of lower alkyl and lower alkenyl having from one to about four carbon atoms with an isopropenyl or isobutenyl lower alkyl ether in the presence of cupric nitrate at a reaction temperature within the range from about 10° to about 150°C., thereby obtaining an $\alpha$, $\beta$-ethylenic ketone.

9. A process according to claim 8, in which R' is

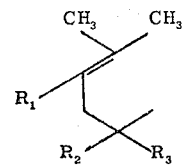

wherein $R_1$, $R_2$ and $R_3$ are selected from the group consisting of hydrogen, lower alkyl and lower alkenyl having from one to about four carbon atoms
R'' is lower alkyl.

10. A process according to claim 8, in which the reaction time is from 0.2 to about 72 hours.

11. A process according to claim 8, in which the amount of cupric nitrate is within the range from about 0.1 to about 3.5% by weight of the reaction mixture.

12. A process according to claim 8, in which the amount of cupric nitrate is within the range from about 3.5 to about 10% by weight of the reaction mixture.

13. A process according to claim 8, in which the reaction temperature is from 15° to 125°C.

14. A process according to claim 8, in which the tertiary acetylenic carbinol is condensed with an isopropenyl lower alkyl ether.

15. A process according to claim 8, in which the tertiary acetylenic carbinol is condensed with an isobutenyl lower alkyl ether.

* * * * *

15-027

UNITED STATES PATENT OFFICE
CERTIFICATE OF CORRECTION

Patent No. 3,886,216      Dated May 27, 1975

Inventor(s) Robert S. DeSimone et al

It is certified that error appears in the above-identified patent and that said Letters Patent are hereby corrected as shown below:

Column 1, line 4      : "Iones" should be --Ionones--

Column 1, line 29     : "dehydrolinallol" should be --dehydrolinalool--

Column 10, line 66    : "3³" should be -- cis-$\Delta^3$ --

Column 15, line 22    : "liuqid" should be --liquid--

Column 15, lines 37 & 38:   $NO_3)_2 \cdot 3H_2O$   Cu(- should be $Cu(NO_3)_2 \cdot 3H_2O$

Column 15, lines 59 & 60 :   $NO_3)_2 \cdot 3H_2O$   Cu(- should be $Cu(NO_3)_2 \cdot 3H_2O$

Signed and Sealed this

*thirteenth* Day of *April 1976*

[SEAL]

Attest:

RUTH C. MASON
*Attesting Officer*

C. MARSHALL DANN
*Commissioner of Patents and Trademarks*